(12) United States Patent
Watson

(10) Patent No.: US 9,311,491 B2
(45) Date of Patent: Apr. 12, 2016

(54) SYSTEMS, METHODS, AND COMPUTER PROGRAM PRODUCTS FOR SECURELY MANAGING DATA ON A SECURE ELEMENT

(71) Applicant: GOOGLE INC., Mountain View, CA (US)

(72) Inventor: Curtis W. Watson, Aubrey, TX (US)

(73) Assignee: GOOGLE INC., Mountain View, CA (US)

( * ) Notice: Subject to any disclaimer, the term of this patent is extended or adjusted under 35 U.S.C. 154(b) by 21 days.

(21) Appl. No.: 14/488,366

(22) Filed: Sep. 17, 2014

(65) Prior Publication Data

US 2015/0096045 A1 Apr. 2, 2015

Related U.S. Application Data

(60) Provisional application No. 61/884,719, filed on Sep. 30, 2013.

(51) Int. Cl.
*H04L 29/06* (2006.01)
*G06F 21/60* (2013.01)
*H04W 12/00* (2009.01)

(52) U.S. Cl.
CPC .............. *G06F 21/60* (2013.01); *H04W 12/00* (2013.01)

(58) Field of Classification Search
CPC ...................................................... G06F 21/60
USPC .......................................................... 726/26
See application file for complete search history.

(56) References Cited

U.S. PATENT DOCUMENTS

| | | | |
|---|---|---|---|
| 5,590,038 A | 12/1996 | Pitroda | 395/241 |
| 5,640,002 A | 6/1997 | Ruppert et al. | 235/472 |
| 5,748,740 A | 5/1998 | Curry et al. | 380/25 |
| 5,805,702 A | 9/1998 | Curry et al. | 380/24 |
| 5,884,271 A | 3/1999 | Pitroda | 705/1 |
| 5,901,303 A | 5/1999 | Chew | 395/400 |
| 5,940,510 A | 8/1999 | Curry et al. | 380/25 |
| 5,949,880 A | 9/1999 | Curry et al. | 380/24 |
| 6,073,840 A | 6/2000 | Marion | 235/381 |
| 6,105,013 A | 8/2000 | Curry et al. | 705/65 |
| 6,116,505 A | 9/2000 | Withrow | 235/381 |
| 6,131,811 A | 10/2000 | Gangi | 235/380 |

(Continued)

FOREIGN PATENT DOCUMENTS

| | | |
|---|---|---|
| CA | 2 381 614 A1 | 3/2001 |
| EP | 1 222 503 A2 | 7/2002 |

(Continued)

OTHER PUBLICATIONS

Int'l Search Report and Written Opinion issued in connection with Int'l Appl'n No. PCT/US2014/055983 on Dec. 15, 2014 (14 pages).

*Primary Examiner* — Longbit Chai
(74) *Attorney, Agent, or Firm* — Johnson, Marcou & Isaacs, LLC

(57) ABSTRACT

Systems, methods, and computer program products are provided for managing applets. A first request to personalize the first applet is received over a communications network. A second request including a command requesting at least a portion of the second applet data is communicated to the second applet. At least a portion of the second applet data is communicated to the first applet. One or more values of the first applet data are replaced with one or more values of at least the portion of the second applet data.

21 Claims, 5 Drawing Sheets

(56) References Cited

U.S. PATENT DOCUMENTS

| | | | |
|---|---|---|---|
| 6,237,095 B1 | 5/2001 | Curry et al. | 713/178 |
| 6,422,464 B1 | 7/2002 | Terranova | 235/384 |
| 6,587,835 B1 | 7/2003 | Treyz et al. | 705/14 |
| 6,601,759 B2 | 8/2003 | Fife et al. | 235/375 |
| 6,671,358 B1 | 12/2003 | Seidman et al. | 379/93.12 |
| 6,732,081 B2 | 5/2004 | Nicholson | 705/14 |
| 6,769,607 B1 | 8/2004 | Pitroda et al. | 235/380 |
| 6,813,609 B2 | 11/2004 | Wilson | 705/14 |
| 6,837,436 B2 | 1/2005 | Swartz et al. | 235/472.02 |
| 6,925,439 B1 | 8/2005 | Pitroda | 705/1 |
| 7,083,094 B2 | 8/2006 | Cooper | 235/449 |
| 7,110,792 B2 | 9/2006 | Rosenberg | 455/558 |
| 7,127,236 B2 | 10/2006 | Khan et al. | 455/414.1 |
| 7,155,405 B2 | 12/2006 | Petrovich | 705/26 |
| 7,194,422 B1 | 3/2007 | St. John Killick | 705/14 |
| 7,216,109 B1 | 5/2007 | Donner | 705/64 |
| 7,249,112 B2 | 7/2007 | Berardi et al. | 705/79 |
| 7,286,818 B2 | 10/2007 | Rosenberg | 455/414.1 |
| 7,298,271 B2 | 11/2007 | Sprogis | 340/572.1 |
| 7,308,426 B1 | 12/2007 | Pitroda | 705/35 |
| 7,330,714 B2 | 2/2008 | Rosenberg | 455/412.1 |
| 7,349,885 B2 | 3/2008 | Gangi | 705/41 |
| 7,469,151 B2 | 12/2008 | Khan et al. | 455/558 |
| 7,469,381 B2 | 12/2008 | Ording | 715/702 |
| 7,483,858 B2 | 1/2009 | Foran et al. | 705/39 |
| 7,494,055 B2 | 2/2009 | Fernandes et al. | 235/380 |
| 7,529,563 B1 | 5/2009 | Pitroda | 455/558 |
| 7,571,139 B1 | 8/2009 | Giordano et al. | 705/40 |
| 7,581,678 B2 | 9/2009 | Narendra et al. | 235/451 |
| 7,613,628 B2 | 11/2009 | Ariff et al. | 705/14 |
| 7,631,810 B2 | 12/2009 | Liu et al. | 235/451 |
| 7,693,752 B2 | 4/2010 | Jaramillo | 705/26 |
| 7,708,198 B2 | 5/2010 | Gangi | 235/380 |
| 7,712,658 B2 | 5/2010 | Gangi | 235/380 |
| 7,775,430 B2 | 8/2010 | Lin | 235/383 |
| 7,805,615 B2 | 9/2010 | Narendra et al. | 713/186 |
| 7,828,214 B2 | 11/2010 | Narendra et al. | 235/451 |
| 7,856,377 B2 | 12/2010 | Cohagan et al. | 705/14.3 |
| 7,864,163 B2 | 1/2011 | Ording et al. | 345/173 |
| 7,942,337 B2 | 5/2011 | Jain | 235/492 |
| 7,954,715 B2 | 6/2011 | Narendra et al. | 235/451 |
| 7,954,716 B2 | 6/2011 | Narendra et al. | 235/451 |
| 7,954,717 B2 | 6/2011 | Narendra et al. | 235/451 |
| 7,961,101 B2 | 6/2011 | Narendra et al. | 340/572.1 |
| 7,967,215 B2 | 6/2011 | Kumar et al. | 235/492 |
| 7,991,158 B2 | 8/2011 | Narendra et al. | 380/260 |
| 8,072,331 B2 | 12/2011 | Narendra et al. | 340/572.1 |
| 8,083,145 B2 | 12/2011 | Narendra et al. | 235/451 |
| 8,091,786 B2 | 1/2012 | Narendra et al. | 235/451 |
| 8,131,645 B2 | 3/2012 | Lin et al. | 705/51 |
| 8,140,418 B1 | 3/2012 | Casey et al. | 705/35 |
| 8,396,808 B2 | 3/2013 | Greenspan | 705/64 |
| 8,429,046 B2 | 4/2013 | Pitroda | 705/35 |
| 2002/0049631 A1 | 4/2002 | Williams | 705/14 |
| 2002/0082921 A1 | 6/2002 | Rankin | 705/14 |
| 2002/0174025 A1 | 11/2002 | Hind et al. | 705/26 |
| 2002/0179703 A1 | 12/2002 | Allen | 235/381 |
| 2003/0009382 A1 | 1/2003 | D'Arbeloff et al. | 705/17 |
| 2003/0083042 A1 | 5/2003 | Abuhamdeh | 455/406 |
| 2003/0115126 A1 | 6/2003 | Pitroda | 705/36 |
| 2003/0132298 A1 | 7/2003 | Swartz et al. | 235/472.02 |
| 2003/0200489 A1 | 10/2003 | Hars | 714/703 |
| 2004/0073519 A1 | 4/2004 | Fast | 705/65 |
| 2004/0186768 A1 | 9/2004 | Wakim et al. | 705/14 |
| 2005/0004866 A1 | 1/2005 | Bonalle et al. | 705/39 |
| 2005/0171898 A1 | 8/2005 | Bishop et al. | 705/39 |
| 2005/0222961 A1 | 10/2005 | Staib et al. | 705/64 |
| 2005/0234769 A1 | 10/2005 | Jain et al. | 705/14 |
| 2005/0247777 A1 | 11/2005 | Pitroda | 235/380 |
| 2006/0287004 A1 | 12/2006 | Fuqua | 455/558 |
| 2007/0014407 A1 | 1/2007 | Narendra et al. | 380/259 |
| 2007/0014408 A1 | 1/2007 | Narendra et al. | 380/270 |
| 2007/0198432 A1 | 8/2007 | Pitroda et al. | 705/64 |
| 2008/0306849 A1 | 12/2008 | Johnson, Jr. et al. | 705/35 |
| 2009/0006640 A1 | 1/2009 | Brouwer et al. | 709/231 |
| 2009/0108064 A1 | 4/2009 | Fernandes et al. | 235/380 |
| 2009/0164322 A1 | 6/2009 | Khan et al. | 705/14 |
| 2010/0241494 A1 | 9/2010 | Kumar et al. | 705/14.1 |
| 2010/0318812 A1 | 12/2010 | Auradkar et al. | 713/193 |
| 2011/0073663 A1 | 3/2011 | Narendra et al. | 235/492 |
| 2011/0171996 A1 | 7/2011 | Narendra et al. | 455/558 |
| 2011/0223972 A1 | 9/2011 | Narendra et al. | 455/558 |
| 2011/0231238 A1 | 9/2011 | Khan et al. | 705/14.26 |
| 2011/0244796 A1 | 10/2011 | Khan et al. | 455/41.1 |
| 2011/0269438 A1 | 11/2011 | Narendra et al. | 455/414.1 |
| 2011/0271044 A1 | 11/2011 | Narendra et al. | 711/103 |
| 2011/0272468 A1 | 11/2011 | Narendra et al. | 235/492 |
| 2011/0272469 A1 | 11/2011 | Narendra et al. | 235/492 |
| 2012/0064828 A1 | 3/2012 | Khan et al. | 455/41.1 |
| 2012/0109764 A1 | 5/2012 | Martin et al. | 705/17 |
| 2012/0323664 A1 | 12/2012 | Klems | 705/14.26 |
| 2013/0160134 A1 | 6/2013 | Marcovecchio et al. | 726/26 |
| 2014/0172700 A1* | 6/2014 | Teuwen | G06Q 20/367 705/41 |

FOREIGN PATENT DOCUMENTS

| | | |
|---|---|---|
| EP | 0 766 852 B1 | 8/2004 |
| EP | 1 412 890 A4 | 11/2004 |
| EP | 1 477 943 A2 | 11/2004 |
| EP | 2 003 842 A1 | 12/2008 |
| WO | WO 01/18629 A3 | 3/2001 |
| WO | WO 03/012717 A1 | 2/2003 |
| WO | WO 2006/007329 A1 | 1/2006 |

* cited by examiner

SYSTEMS, METHODS, AND COMPUTER PROGRAM PRODUCTS FOR SECURELY MANAGING DATA ON A SECURE ELEMENT

CROSS REFERENCE TO RELATED APPLICATION

This application claims priority to U.S. Provisional Patent Application No. 61/884,719, filed Sep. 30, 2013, the entire contents of which are incorporated herein by reference.

BACKGROUND

1. Field

The present invention relates generally to systems, methods, and computer program products for securely managing data on a secure element.

2. Related Art

Applications stored and functioning on mobile devices are increasingly being used to conduct secure communications which require the transmission of highly critical data. Such applications include mobile wallet applications, which may be used to perform contactless transactions. Contactless transactions may be financial (e.g., payments, commerce) or non-financial (e.g., venue admissions, transit ticketing). These secure communications, including contactless transactions, typically involve the exchange of critical data between mobile devices and other systems such as reader terminals using, for example, near field communication (NFC) technology.

Mobile devices include, or have stored on the mobile device memory, applications used to initiate contactless transactions, as well as those applications' corresponding non-critical data. On the other hand, the applications' critical data (e.g., personal data, security keys, passcodes, identifiers) is stored in a secure element (SE) associated with the mobile device. Secure elements are highly tamper resistant components which securely store data in accordance with specific security requirements. Because of their specialized security mechanisms, secure element storage is more costly than typical memory (e.g., mobile device memory) and thus, storage on secure elements is often exclusively limited to critical data.

Critical data is managed by corresponding applets on the secure element which control, for example, how the data is stored, when the data can be distributed, and which devices, applets and applications can access (e.g., read, write) the data. The applets which manage critical data on secure elements may need, or choose to be, altered or deleted, for example, to update out-of-date or unsupported applet versions or to repair corrupted applet versions. Such alteration or deletion of applets that manage critical data may cause those applets' corresponding critical data to be deleted or be left unmanaged on the secure element during periods in which those managing applets are not yet installed, updated or activated. Deletion of critical data may result in the need for that critical data to be requested and acquired from its source, or worse, that critical data may be lost.

Given the foregoing, it would be beneficial to store critical data on secure elements in a manner which allows for managing applets to be altered (e.g., updated, deleted) without resulting in data loss or minimization of the security of the critical data.

One technical challenge involves securely storing critical data during time periods when managing applets are not fully active (e.g., pending update). Another technical challenge involves managing applets receiving the most up-to-date critical data when those managing applets become fully active (e.g., post-update).

BRIEF DESCRIPTION

The example embodiments presented herein meet the above-identified needs by providing systems, methods, and computer program products for securely managing data on a secure element.

In one example embodiment, a system for managing applets comprises at least one memory operable to store a first applet including first applet data and a second applet including second applet data. The system also includes a processor coupled to the at least one memory. A first request to personalize the first applet is received, over a communications network. A second request including a command requesting at least a portion of the second applet data is communicated to the second applet. At least a portion of the second applet data is communicated to the first applet. One or more values of the first applet data are replaced with one or more values of at least the portion of the second applet data.

In another example embodiment, a method for managing applets, the method includes: receiving, over a communications network, a first request to personalize a first applet; communicating a second request to a second applet, the second request including a command requesting at least a portion of second applet data; communicating at least the portion of the second applet data to the first applet; and replacing one or more values of first applet data with one or more values of at least the portion of the second applet data.

In another example embodiment, a non-transitory computer-readable medium has stored thereon sequences of instructions that, when executed by a computer processor, cause the processor to: receive, over a communications network, a first request to personalize the first applet; communicate a second request to a second applet, the second request including a command requesting at least a portion of second applet data; communicate at least the portion of the second applet data to the first applet; and replace one or more values of first applet data with one or more values of at least the portion of the second applet data.

BRIEF DESCRIPTION OF THE DRAWINGS

The features and advantages of the example embodiments presented herein will become more apparent from the detailed description set forth below when taken in conjunction with the following drawings.

DETAILED DESCRIPTION

I. Overview

The example embodiments presented herein are directed to systems, methods and computer program products for securely managing data on a secure element, which are described herein in terms of applets and applications for conducting contactless mobile transactions (e.g., commerce and payment) in a mobile wallet environment. This description is not intended to limit the application of the example embodiments presented herein. In fact, after reading the following description, it will be apparent to one skilled in the relevant art(s) how to implement the following example embodiments for any type of applets and/or applications on mobile devices, within or outside of a mobile wallet environment.

In exemplary embodiments presented herein, a wallet companion applet (WCAp) is an applet stored on a secure element and acts as a representative of a mobile wallet application. The mobile wallet application may use the WCAp for, among other things, securely storing and managing data (e.g., critical data) in the secure element on its behalf. A secure assistant applet (ISAp) is an applet stored on the secure element and acts as a secure storage location for data of (or corresponding to) other applets including, for example, the WCAp.

The WCAp is replaced with a new WCAp (or WCAp instance). A WCAp establishes a shareable interface object (SIO) with an ISAp, over which data and communications may be exchanged. The WCAp transmits to the ISAp, over the SIO, data to be stored or backed up on behalf of the WCAp. The WCAp is deleted from the secure element, in accordance with a request received from a trusted service manager (TSM). A new WCAp package is loaded on the secure element and a new WCAp instance is created using the newly loaded WCAp package. The new WCAp (or WCAp instance) is personalized using non-critical data and/or parameters received from the TSM. The WCAp transmits a request to the ISAp to receive critical parameters stored on behalf of the WCAp that was previously deleted and/or replaced. The ISAp transmits critical parameters to the WCAp, which are, in turn, stored in or by the WCAp on the secure element. The WCAp, ISAp and SIO are explained in further detail below with reference to at least FIGS. 1-3.

II. System

Figure 1:
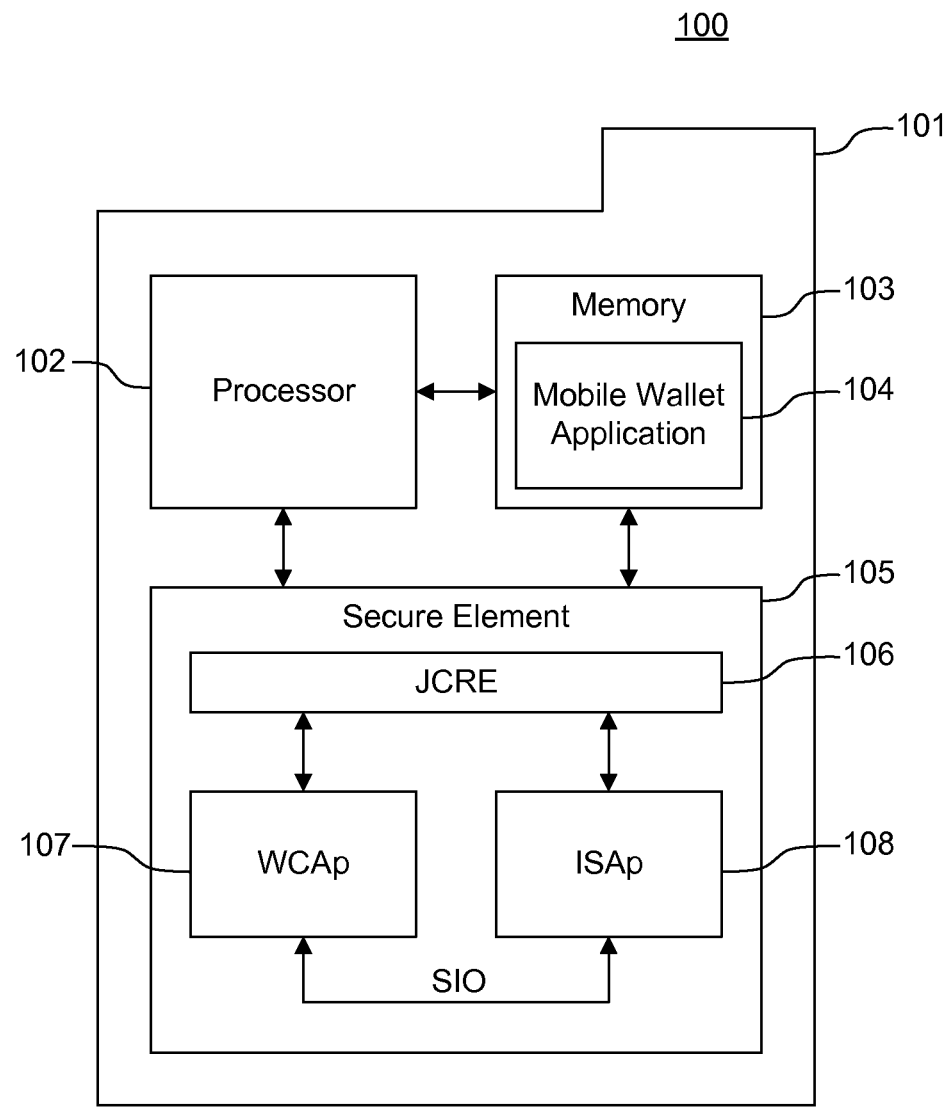
FIG. 1 is a diagram of a system for securely managing data according to an exemplary embodiment.

FIG. 1 is a diagram of a system 100 for securely managing data, in accordance with example embodiments presented herein. As shown in FIG. 1, the system 100 includes a mobile device 101, which includes a processor 102, memory 103 and a secure element (SE) 105. The mobile device 101 may be, for example, a cellular phone, tablet or the like. Although not illustrated in FIG. 1, the mobile device 101 may include a contactless frontend (CLF), a baseband modem, and a user interface such as a display screen. A baseband modem is a digital modem that is used for wireless communications. A CLF is circuitry which handles the analog aspects of contactless or NFC and the communication protocol layers of contactless transmission link.

The mobile device 101 also includes a mobile wallet application 104, which may be stored on the memory 103 of the mobile device. The mobile wallet application 104 includes instructions which, when executed by the processor 102 of the mobile device 101, cause the mobile device 101 to act as an instrument for processing contactless transactions and the like. The mobile wallet application 104 also includes (e.g., uses, operates on, is associated with) non-critical data which may be stored on the memory 103 of the mobile device 101. Non-critical data may include information used by the mobile wallet application 104 during its functionality, including images, system information, preferences, and the like. Each application (e.g., mobile wallet application 104) or entity/provider managing each application have corresponding standards that define which types of data are non-critical (as opposed to critical). The mobile wallet application 104 may also be associated with critical data, which may include codes (e.g., passcodes), credentials, security keys, identifiers, and the like. Critical data is typically stored in a secure element, such as secure element 105.

Secure element 105 may be implemented as a Universal Integrated Circuit Card (UICC), embedded SE card, secure micro digital (microSD) card, and the like. Secure element 105 may also be implemented as a virtual secure element, which can be maintained outside of the mobile device 101 on a memory accessible by the mobile device 101, including but not limited to, for example, a remote server or computer, in a cloud-based architecture, and the like. A secure element (e.g., secure element 105) is generally considered secure because it is a self-contained system, including dedicated memory, and is protected by hardware and software hardening techniques that are verified by independent testing.

The secure element 105 includes a Java Card Runtime Environment (JCRE) 106, which is a secure element card execution environment that allows applets stored therein to run, function and/or communicate, for example, by offering for use classes for input/output (I/O), messaging and cryptography. Such applets may include, for example, a wallet companion applet (WCAp) 107 and a secure assistant applet (ISAp) 108, as shown in FIG. 1.

The WCAp 107 is an applet stored on the secure element 105 and acts as a representative of the mobile wallet application 104. The mobile wallet application 104 may use the WCAp 107 for, among other things, securely storing and managing data (e.g., critical data) in the secure element 104 on its behalf. ISAp 108 is an applet stored on the secure element 105 and acts as a secure storage location for data of (or corresponding to) other applets including, for example, WCAp 107.

In one example embodiment, the WCAp 107 maintains and/or stores a list of data (e.g., data objects, data elements) used, or which may be used, by the mobile wallet application 104. Table 1 below lists examples of data stored by the WCAp 107 and corresponding maximum data size in bytes for each data element according to an exemplary embodiment.

TABLE 1

| Data Element | Max Size in Bytes |
| --- | --- |
| ICCID | >0 and <=16 |
| IMEI/MEID/Device ID | >0 and <=64 |
| Wallet ID | >0 and <=64 |
| Wallet Passcode | 8 |
| Wallet Server Key | 16 |
| Wallet Server KVC | 3 |
| Enhanced WS Key | 24 |
| Enhanced WS KVC | 3 |
| Enhanced WS HMAC Key | 32 |
| Enhanced WS HMAC KVC | 3 |
| SIO Authentication Secret | 32 |
| Widget Authentication Blob | <=1K |
| Wallet Unique Code | 16 |

Integrated Circuit Card Identifier (ICCID) is a unique serial number or identifier (ID) corresponding to a subscriber identity module (SIM) or other secure element.

International Mobile Equipment Identifier (IMEI) refers to a unique number or identifier corresponding to a mobile device (e.g., mobile phone). A Mobile Equipment Identifier (MEID) or other device ID are similar unique numbers or identifiers corresponding to other types of mobile devices, such as those functioning on code division multiple access (CDMA) networks.

Wallet ID refers to a unique number or identifier corresponding to a wallet client (e.g., mobile wallet application).

Wallet Passcode refers to a unique passcode or password used to authenticate a wallet client user. The Wallet Passcode may be a 4-character code in UNICODE.

Wallet Server Key refers to an authentication key for providing authentication between a wallet client (and/or associated applets (e.g., wallet companion applet (WCAp))) and a wallet server. The Wallet Server Key may be generated, for example, in accordance with a triple data encryption algorithm (TDEA) symmetric key-block cypher or the like.

Wallet Server Key Verification Code (KVC) refers to a value for verifying or authenticating a Wallet Server Key.

Enhanced Wallet Server (WS) Key refers to a key for providing authentication between a wallet client (and/or associated applets) and a wallet server. The Enhanced WS Key may be generated, for example, in accordance with a triple data encryption algorithm (TDEA) symmetric key-block cypher or the like. Enhanced WS KVC refers to a value for verifying or authenticating an Enhanced WS Key.

Enhanced WS HMAC Key and Enhanced WK HMAC KVC refer respectively to a key and key verification code or value developed in accordance with hash message authentication code (HMAC) cryptographic functions.

SIO Authentication Secret refers to a value or code used to authenticate an applet or system requesting the establishment of a Shareable Interface Object (SIO) (e.g., JavaCard SIO). Establishment of an SIO is described in more detail below with reference to FIG. 2.

Widget Authentication Blob refers to a set of stored data used to authenticate widgets (e.g., application, component of an interface) requesting access to applets on secure elements. For example, a Widget Authentication Blob may be used to store a widget ID, widget signature and widget version corresponding to one or more widgets. When a widget requests access to an applet on a secure element, the widgets data is compared to the data stored in the Widget Authentication Blob and access may be granted to the applet based on that comparison.

Wallet Client Unique Code refers to a value used by a wallet client for authentication during a transaction.

In one example embodiment, the ISAp 108 maintains and/or stores data for or on behalf of the WCAp 107. Such data maintained by the ISAp 108 typically includes data which is not stored other than in the WCAp 107. That is, the ISAp 108 acts as the sole backup or disaster recovery storage for the WCAp 107 within the secure element 105, thereby making that data accessible to the WCAp 107 in the event that the WCAp 107 is deleted, updated and/or modified and that data is needed and/or used to make the WCAp 107 (or another instance of a WCAp) functional.

Table 2 below lists examples of data stored by the WCAp 107 and an indication of whether that data is stored in the WCAp 107 only or in the WCAp 107 and the ISAp 108.

TABLE 2

| Data Element | Storage Location |
| --- | --- |
| ICCID | WCAp |
| IMEI/MEID/Device ID | WCAp |
| Wallet ID | WCAp |
| Wallet Passcode | WCAp and ISAp |
| Wallet Server Key | WCAp and ISAp |
| Wallet Server KVC | WCAp |
| Enhanced WS Key | WCAp and ISAp |
| Enhanced WS KVC | WCAp |
| Enhanced WS HMAC Key | WCAp and ISAp |

TABLE 2-continued

| Data Element | Storage Location |
| --- | --- |
| Enhanced WS HMAC KVC | WCAp |
| SIO Authentication Secret | WCAp |
| Widget Authentication Blob | WCAp |
| Wallet Unique Code | WCAp and ISAp |

Applets in the secure element 105, such as WCAp 107 and ISAp 108, may communicate with or among each other to exchange information. For example, WCAp 107 may communicate with ISAp 108 to obtain and/or retrieve data that is needed for the WCAp 107 to be personalized. In one example embodiment, applets may communicate using an SIO or the like.

A. SIO Establishment and Applet Authentication

Figure 2:
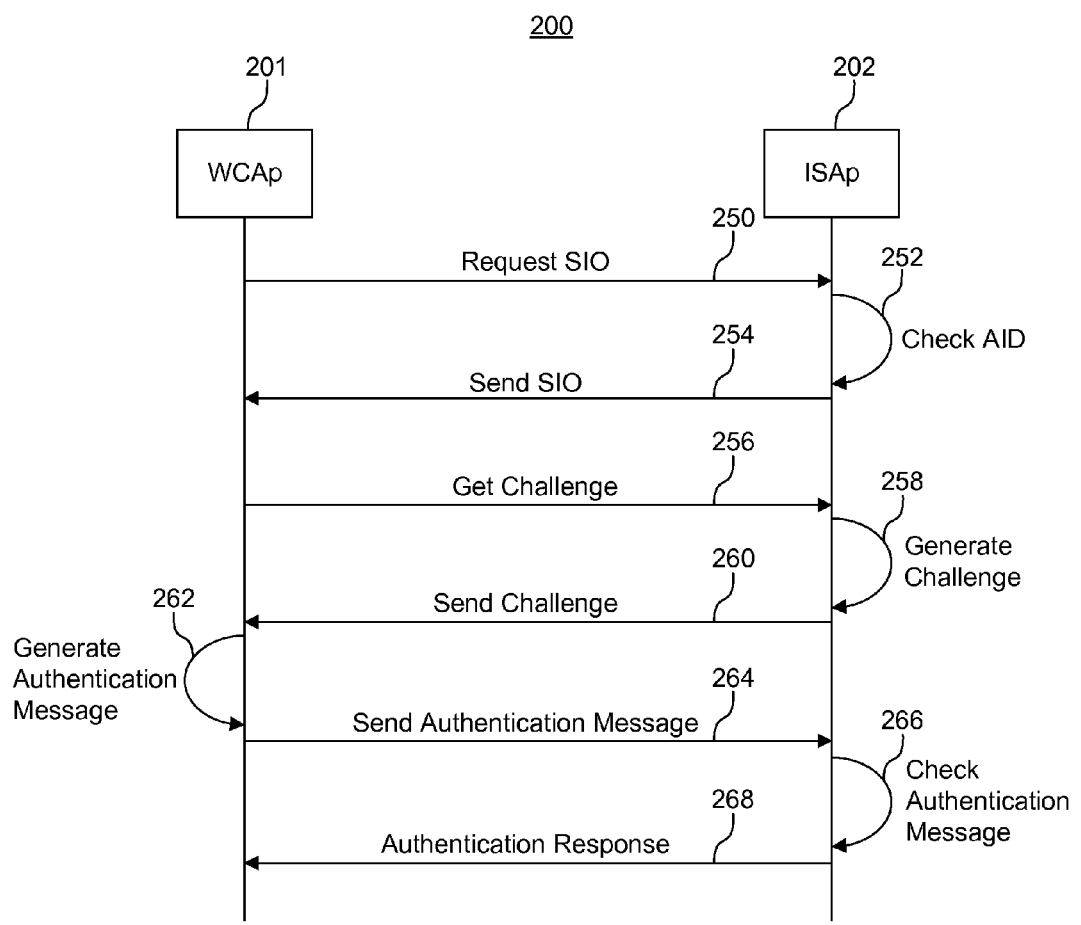
FIG. 2 is a sequence diagram for establishing a shareable interface object (SIO) between applets and providing authentication of the SIO-requesting applet according to an exemplary embodiment.

FIG. 2 is a sequence diagram 200 for establishing an SIO between applets and providing authentication of the SIO-requesting applet. In particular, in FIG. 2, an SIO is established between a WCAp 201 (e.g., FIG. 1, WCAp 107) and an ISAp 202 (e.g., FIG. 1, ISAp 108), and the requesting applet WCAp 201 is authenticated. Although not illustrated in FIG. 2, the WCAp 201 and ISAp 202 may communicate via the runtime environment (e.g., FIG. 1, JCRE 106) on which the applets are deployed. It should be understood that this process may be used to establish an SIO between and authenticate any two applets.

At step 250, the WCAp 201 transmits a "request SIO" command to the ISAp 202. The "request SIO" message may include an application identifier (AID) corresponding to the transmitting and/or requesting applet, i.e., WCAp 201. At step 252, the ISAp 202 checks whether the received AID corresponds to an expected and/or authorized applet and, if so, transmits a "send SIO" message to the WCAp 201, at step 254. The send SIO message may include information associated with the established SIO.

In turn, at step 256, the WCAp 201 transmits a "get challenge" command to the ISAp 202, requesting that a challenge be returned to the WCAp 201. The ISAp 202, in response to receiving the get challenge command, generates a challenge at step 258. A challenge may be a random value such as an 8-byte random number. At step 260, the ISAp 202 transmits the generated challenge to the WCAp 201.

At step 262, the WCAp 201 uses the received challenge to generate an authentication message. The authentication message may be made up of a combination of all or a portion of data available to or known by the WCAp 201 and the ISAp 202, including the challenge generated at step 258, shared authentication keys, and/or the AID of the WCAp 201. The authentication message may be generated using symmetric key algorithms such as data encryption standard (DES).

In turn, the WCAp 201 transmits to the ISAp 202, at step 264, the generated authentication message. The ISAp 202, at step 266, checks the received authentication message by (1) generating a comparison authentication message using the same data and algorithm expected to have been used by the WCAp 201 at step 262, (2) comparing the comparison authentication message to the authentication message received from the WCAp 201, and (3) determining whether the comparison authentication message and the authentication message received from the WCAp 201 match.

At step 268, the ISAp 202 transmits an authentication response to the WCAp 201. For example, if the two authentication messages are determined to be a match at step 266, the ISAp 202 transmits an authentication response indicating that access by the WCAp 201 to the ISAp 202 is granted.

Otherwise, the ISAp 202 may transmit an authentication response indicating access is not granted and/or a reason for why access is not granted.

Data stored by the WCAp 107 in FIG. 1 may be transmitted or provided to the WCAp 107 via commands during a personalization phase. For example, those commands may be application protocol data unit (APDU) commands such as a "store data" command issued by a trusted service manager (TSM) and used to store data in the WCAp 107.

Once the WCAp 107 is personalized (e.g., loaded with data), the WCAp 107 populates the ISAp 108 with data typically stored (e.g., expected) by the ISAp 108, as discussed above with reference to Table 2. That is, the WCAp 107, when personalized, may transmit data to the ISAp 108, which is operable to store or back up data on behalf of the WCAp 107.

To determine whether the ISAp 108 is populated and/or needs to be populated by the WCAp 107, the WCAp 107 may call a method (or function) such as:

public abstract void ISAaToWCApReport (byte Code)

That method (e.g., ISAaToWCApReport) allows the ISAp 108 to report to the WCAp 107 by returning a code (e.g., byte Code) indicating, for example, whether (1) the ISAp 108 is being installed with no data (i.e., ISAp 108 is empty), (2) the ISAp 108 is being deleted, or (3) data needs to be uploaded, transmitted or provided to the ISAp 108 (i.e., at least some expected data is missing from the ISAp 108).

III. Process

Figure 3A:
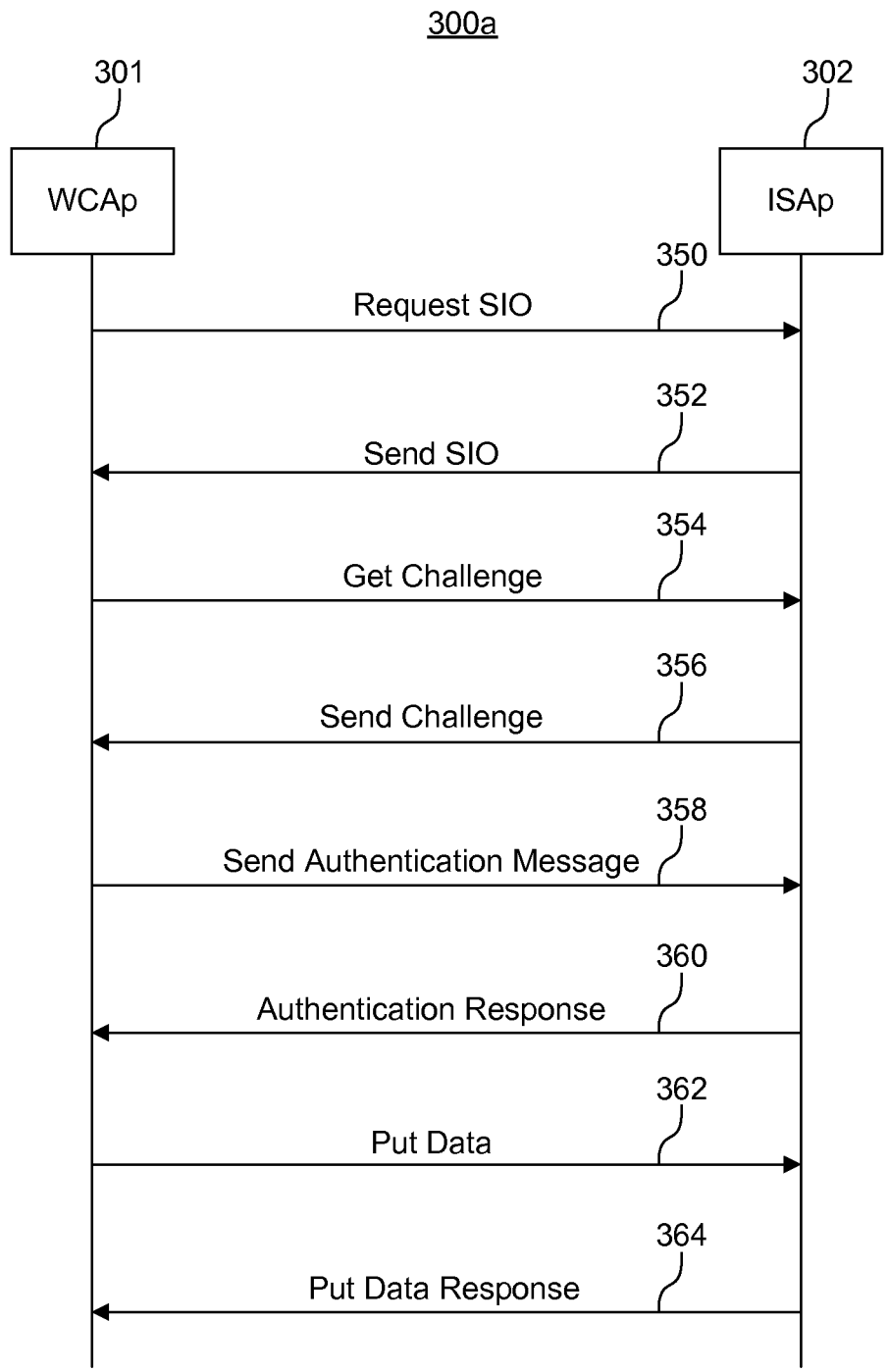
FIGS. 3a and 3b are sequence diagrams for replacing a WCAp on a secure element according to an exemplary embodiment.
Figure 3B:
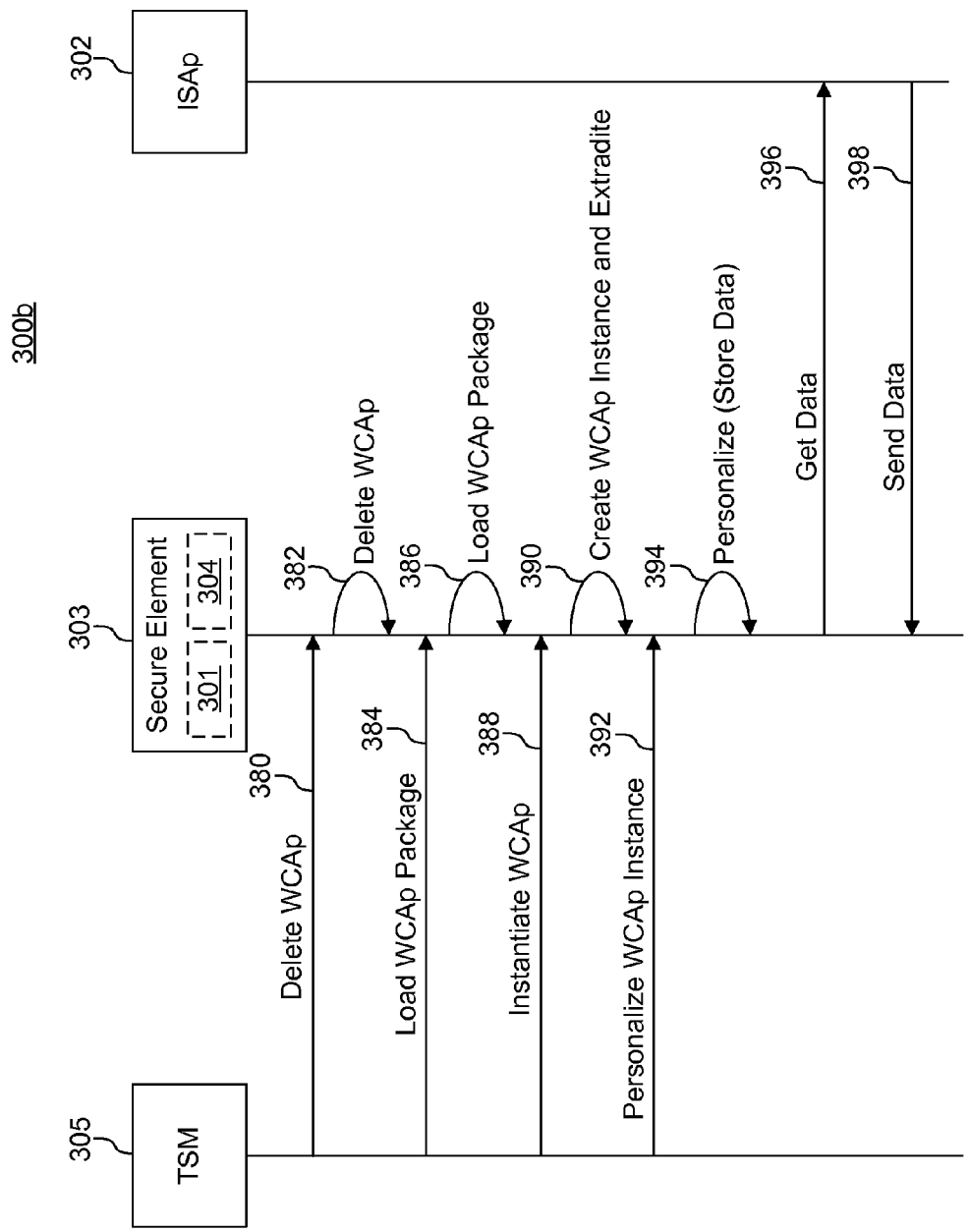

FIGS. 3a and 3b are sequence diagrams 300a and 300b, respectively, of processes for replacing a WCAp (e.g., FIG. 1, WCAp 107) stored on a secure element (e.g., FIG. 1; secure element 105) of a mobile device (e.g., FIG. 1; mobile device 101), according to an exemplary embodiment. It should be understood that the above process may be used to replace other types of applets (or applet data) on secure elements of any form factor, including secure elements within or outside of a mobile device. It should also be understood that replacement of data can be performed via transfers between devices in a number of ways. For example, such data transfer can be achieved over-the-air or by sideloading (e.g., via USB, Bluetooth, etc.). Sideloading generally refers to the transfer of data, via an upload or download, between two devices (e.g., mobile device, secure element)

As discussed above with reference to FIG. 1, a WCAp (e.g., WCAp 301) includes and/or stores data along the lines of that shown in Table 1. Typically, ISAp 302 (e.g., FIG. 1, ISAp 108) stores data on behalf of the WCAp 301 along the lines of that shown in Table 2. At any time during the lifecycle of the WCAp 301, the WCAp 301 may obtain a report from ISAp 302 to determine if ISAp 302 is missing any data. For example, the WCAp 301 may obtain a report from the ISAp 302 prior to the deletion and/or replacement of the WCAp 301. This can be accomplished by the WCAp 301, for example, by calling the ISAaToWCApReport function described above. If that function returns a code indicating that at least some data expected to be stored on the ISAp 302 is missing, the WCAp 301 may update and/or replenish the ISAp 302 so that it contains proper critical data (as deemed necessary by the WCAp 301).

FIG. 3a is a sequence diagram 300a for updating (or replenishing) an ISAp (e.g., ISAp 302) in accordance with an exemplary embodiment. The WCAp 301 may establish an SIO with the ISAp 302 as described above with reference to FIG. 2. In particular, at step 350, the WCAp 301 transmits a "request SIO" command to the ISAp 302 indicating that the WCAp 301 would like to communicate over an SIO. The "request SIO" command may include an AID corresponding to the WCAp 301. The ISAp 302 validates the "request SIO" command, for example, by determining whether the AID and/or any data received in that command corresponds to a trusted or known applet, based on information stored by the ISAp 302 such as a list or table of trusted applets and/or corresponding AIDs.

If the ISAp 302 validates the "request SIO" command received at step 350, in returns, at step 352, an SIO (including associated information) over which the WCAp 301 and the ISAp 302 may communicate. The request SIO command may include the AID of the requesting applet (e.g., WCAp 301). The ISAp 302 may validate the request SIO command by determining whether the AID included in the command matches an authorized or expected AID.

At step 354, the WCAp 301 requests a challenge by transmitting a "get challenge" command to the ISAp 302. The ISAp 302, in turn, returns a challenge to the WCAp 301 at step 356. In turn, WCAp 301 transmits an authentication message to the ISAp 302. The ISAp 302 analyzes the authentication message sent at step 356 and, if authentication is successful (e.g., authentication message matches expected value), the ISAp 302 transmits, at step 360, an authentication response to the WCAp 301 indicating that authentication passed and access to the ISAp 302 is granted.

At step 362, the WCAp 301 transmits a "put data" command (or the like) to the ISAp 302, including information which WCAp 301 would like updated and/or replenished on the ISAp 302. For example, the information in the put data command may include a passcode, WC unique code, or any other information typically stored on the ISAp 302. In turn, at step 364, the ISAp 302 transmits a response to the WCAp 301 indicating whether or not the information transmitted in the put data command was successfully added to and/or stored by the ISAp 302, as requested by the WCAp 301.

FIG. 3b is a sequence diagram 300b for replacing a WCAp (e.g., WCAp 301) stored on a secure element (e.g., secure element 303) in accordance with an exemplary embodiment. When replacing the WCAp 301, applets (e.g., payment applets) associated with the WCAp 301 and which may be stored on the secure element 303, are placed into a locked state. This may be done at any point during the replacement of the WCAp 301 but is typically performed prior to initiating a WCAp replacement process, to ensure that any associated applets are not misused during the time that the WCAp 301 is not functional (e.g., while it is being replaced with a new WCAp or WCAp instance). For example, the state of each applet may be changed from active to locked to prevent their use. It should be understood that applets associated with the WCAp 301 (or associated with any applet being replaced) may be locked using any processes executed by any applets or applications having such privileges.

At step 380, a trusted service manager (TSM) 305 (or any system having applet management privileges for the WCAp 301) transmits a delete command to the secure element 303, to delete the WCAp 301. The delete command may include an AID corresponding to the applet to be deleted (e.g., WCAp 301). In turn, at step 382, the secure element 303 deletes the WCAp 301. Although not illustrated, the secure element 303 may transmit a notification to the TSM 305 indicating whether or not the WCAp 301 was successfully deleted. In one exemplary embodiment, the TSM 305 may transmit communications to the secure element 303 via a central security domain (not illustrated) on the secure element 303.

In turn, at step 384, the TSM 305 transmits a load command to the secure element 303. The load command includes instructions to load a WCAp package on the secure element 303. The load command may include the WCAp package to be loaded on the secure element 303. At step 386, the package is loaded on the secure element 303. Although not illustrated, the secure element 303 may transmit a notification to the TSM 305 indicating whether or not the WCAp package was successfully loaded on the secure element 303.

At step 388, the WCAp package loaded at step 384 is instantiated on the secure element 303 to create WCAp 304 on the secure element 303. Typically, instantiation includes creating an applet instance from a loaded package and, if necessary, extraditing the created applet instance to a storage area on a secure element (e.g., a corresponding security domain). At step 390, the package loaded at step 386 is used to create a new WCAp instance (i.e., WCAp 304), and that instance may be extradited to a security domain on the secure element 303. Although not illustrated, the secure element 303 may transmit a notification to the TSM 305 indicating whether or not a new WCAp instance was successfully created (and, if necessary, extradited) on the secure element 303.

Once the WCAp 304 has been created, the TSM 305 transmits, at step 392, a personalization command to the secure element 303 to personalize the WCAp 304. The personalization command may include data to be stored on or by the WCAp 304. Such data may include non-critical parameters stored by the WCAp 304, as outlined in Tables 1 and 2. Non-critical parameters are those solely stored by a WCAp and not backed up by an ISAp. In particular, the personalization command transmitted at step 392 may include, for example, ICCID, IMEI, and wallet ID. At step 394, the secure element 303 uses the data (e.g., non-critical parameters) received in the personalization command to personalize the WCAp 304, for example, by calling a StoreData command. Specifically, the data received in the personalization command is stored in, by, or in association with the WCAp 304.

In turn, at step 396, the WCAp 304 in the secure element 303 transmits a get data command or the like to an associated ISAp (e.g., ISAp 302), to retrieve critical parameters stored by the ISAp 302. Examples of critical parameters stored by an ISAp (e.g., ISAp 302) are described above with reference to Table 2. In one exemplary embodiment, the WCAp 304 may establish an SIO with and/or be authenticated by the ISAp 302 prior to the exchange of critical parameters and/or other data. Establishing an SIO and/or authenticating an ISAp (e.g., ISAp 302) is/are described above in more detail with reference to FIG. 2. The get data command transmitted at step 396 may include an indication of the types of data and/or parameters requested by the WCAp 304.

If the ISAp 302 determines that it has stored thereon some or all of data requested by the WCAp 304 in the get data command, the ISAp 302 retrieves and transmits, at step 398, some or all of the requested data (e.g., critical parameters) to the WCAp 304. Alternatively, and although not illustrated in FIG. 3, the ISAp 302 may transmit a notification to the WCAp 304 indicating, for example, whether or not (1) the ISAp 302 includes or has stored thereon the data requested by the WCAp 304, or (2) processing of the get data command transmitted at step 396 was successful.

In an exemplary embodiment, applets that were associated with the WCAp 301 prior to it being replaced with WCAp 304, may be unlocked and placed in a usable or active state, if they were or had been placed in a locked state. In particular, applets, if any, that were locked to prevent their functionality during the replacement of WCAp 301 may be unlocked to allow for their operability to be resumed. It should be understood that unlocking applets may be achieved in any manner as desired by an applet owner or provider.

IV. Computer Readable Medium Implementation

The example embodiments described above such as, for example, the systems and procedures depicted in or discussed in connection with FIGS. 1-3 or any part or function thereof, may be implemented by using hardware, software or a combination of the two. The implementation may be in one or more computers or other processing systems. While manipulations performed by these example embodiments may have been referred to in terms commonly associated with mental operations performed by a human operator, no human operator is needed to perform any of the operations described herein. In other words, the operations may be completely implemented with machine operations. Useful machines for performing the operation of the example embodiments presented herein include general purpose digital computers or similar devices.

Figure 4:
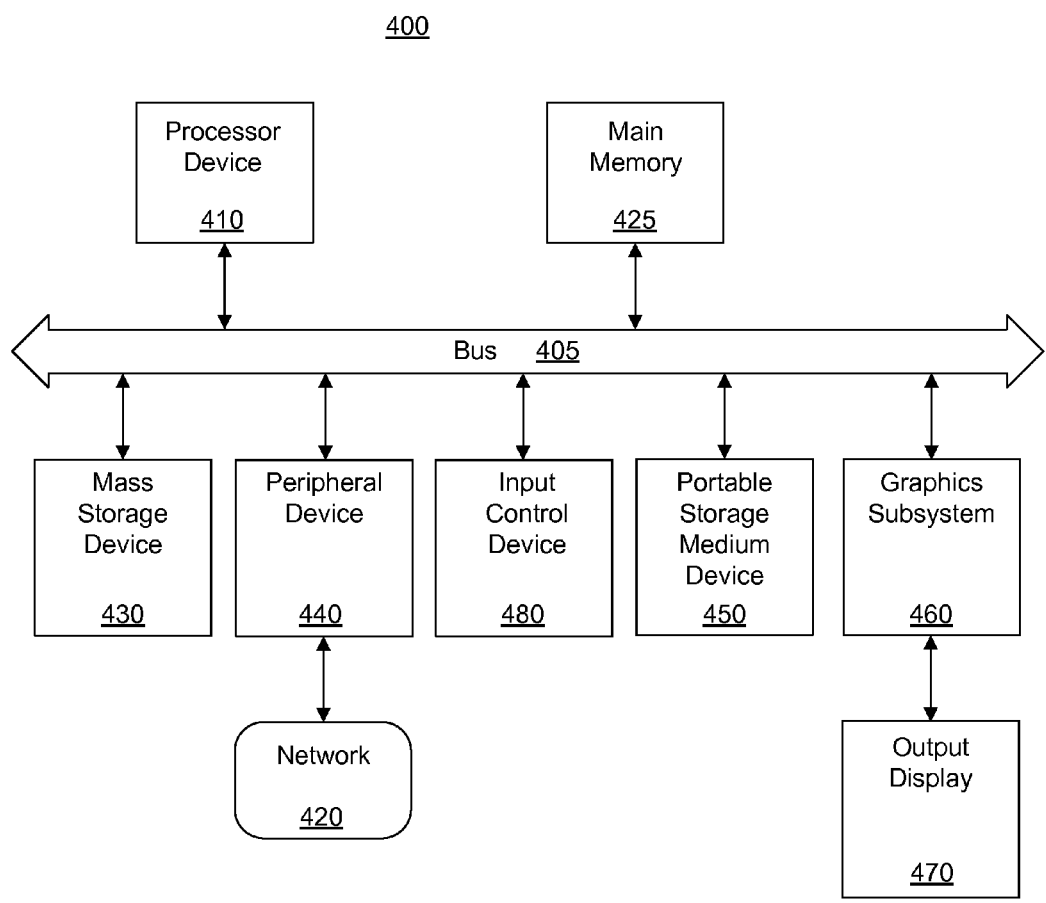
FIG. 4 is a diagram of an example system useful for implementing the present invention.

FIG. 4 is a block diagram of a general and/or special purpose computer 400, in accordance with some of the example embodiments of the invention. The computer 400 may be, for example, a user device, a user computer, a client computer and/or a server computer, among other things.

The computer 400 may include without limitation a processor device 410, a main memory 425, and an interconnect bus 405. The processor device 410 may include without limitation a single microprocessor, or may include a plurality of microprocessors for configuring the computer 400 as a multi-processor system. The main memory 425 stores, among other things, instructions and/or data for execution by the processor device 410. The main memory 425 may include banks of dynamic random access memory (DRAM), as well as cache memory.

The computer 400 may further include a mass storage device 430, peripheral device(s) 440, portable storage medium device(s) 450, input control device(s) 480, a graphics subsystem 460, and/or an output display 470. For explanatory purposes, all components in the computer 400 are shown in FIG. 4 as being coupled via the bus 405. However, the computer 400 is not so limited. Devices of the computer 400 may be coupled via one or more data transport means. For example, the processor device 410 and/or the main memory 425 may be coupled via a local microprocessor bus. The mass storage device, 430, peripheral device(s) 440, portable storage medium device(s) 450, and/or graphics subsystem 460 may be coupled via one or more input/output (I/O) buses. The mass storage device 430 may be a nonvolatile storage device for storing data and/or instructions for use by the processor device 410. The mass storage device 430 may be implemented, for example, with a magnetic disk drive or an optical disk drive. In a software embodiment, the mass storage device 430 is configured for loading contents of the mass storage device 430 into the main memory 425.

The portable storage medium device 450 operates in conjunction with a nonvolatile portable storage medium, such as, for example, a compact disc read only memory (CD-ROM), to input and output data and code to and from the computer 400. In some embodiments, the software for storing an internal identifier in metadata may be stored on a portable storage medium, and may be inputted into the computer 400 via the portable storage medium device 450. The peripheral device(s) 440 may include any type of computer support device, such as, for example, an input/output (I/O) interface configured to add additional functionality to the computer 400. For example, the peripheral device(s) 440 may include a network interface card for interfacing the computer 400 with a network 420.

The input control device(s) 480 provide a portion of the user interface for a user of the computer 400. The input control device(s) 480 may include a keypad and/or a cursor control device. The keypad may be configured for inputting alphanumeric characters and/or other key information. The cursor control device may include, for example, a mouse, a trackball, a stylus, and/or cursor direction keys. In order to display textual and graphical information, the computer 400 may include the graphics subsystem 460 and the output display 470. The output display 470 may include a cathode ray tube (CRT) display and/or a liquid crystal display (LCD). The graphics subsystem 460 receives textual and graphical information, and processes the information for output to the output display 470.

Each component of the computer 400 may represent a broad category of a computer component of a general and/or special purpose computer. Components of the computer 400 are not limited to the specific implementations provided here.

Portions of the example embodiments of the invention may be conveniently implemented by using a conventional general purpose computer, a specialized digital computer and/or a microprocessor programmed according to the teachings of the present disclosure, as is apparent to those skilled in the computer art. Appropriate software coding may readily be prepared by skilled programmers based on the teachings of the present disclosure.

Some embodiments may also be implemented by the preparation of application-specific integrated circuits, field programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation a floppy disk, a mini disk, an optical disc, a Blu-ray Disc, a DVD, a CD-ROM, a micro-drive, a magneto-optical disk, a ROM, a RAM, an EPROM, an EEPROM, a DRAM, a VRAM, a flash memory, a flash card, a magnetic card, an optical card, nano-systems, a molecular memory integrated circuit, a RAID, remote data storage/archive/warehousing, and/or any other type of device suitable for storing instructions and/or data.

Stored on any one of the computer readable medium or media, some implementations include software for controlling both the hardware of the general and/or special computer or microprocessor, and for enabling the computer or microprocessor to interact with a human user or other mechanism utilizing the results of the example embodiments of the invention. Such software may include without limitation device drivers, operating systems, and user applications. Ultimately, such computer readable media further include software for performing example aspects of the invention, as described above.

Included in the programming and/or software of the general and/or special purpose computer or microprocessor are software modules for implementing the procedures described above.

While various example embodiments of the invention have been described above, it should be understood that they have been presented by way of example, and not limitation. It is apparent to persons skilled in the relevant art(s) that various changes in form and detail can be made therein. Thus, the invention should not be limited by any of the above described example embodiments, but should be defined only in accordance with the following claims and their equivalents.

In addition, it should be understood that the figures are presented for example purposes only. The architecture of the example embodiments presented herein is sufficiently flexible and configurable, such that it may be utilized and navigated in ways other than that shown in the accompanying figures. Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A system for managing applets of mobile wallet applications comprising:
   at least one memory operable to store a first applet including first applet data and a second applet including second applet data; and
   a hardware processor coupled to the at least one memory, the processor being operable to:
   receive, over a communications network, a first request to personalize the first applet;
   communicate, in response to receiving the request to personalize the first applet, a second request to the second applet, the second request including a command requesting at least a portion of the second applet data previously stored for use by the second applet;
   communicate at least the portion of the second applet data to the first applet upon the second applet being authenticated to the first applet; and
   replace one or more values of the first applet data of the first applet with one or more values of at least the portion of the second applet data of the second applet.

2. The system of claim 1, wherein the first applet data and the second applet data each comprise cryptographic parameters including at least one of: (1) a passcode, and (2) a mobile wallet client unique code.

3. The system of claim 2, wherein the first applet is a set of instructions stored on the at least one memory, which when executed by the processor, cause the processor to manage the first applet data.

4. The system of claim 2, wherein the second applet is a set of instructions stored on the at least one memory, which when executed by the processor, cause the processor to manage the second applet data.

5. The system of claim 1, wherein the system is included in a secure element associated with a mobile device.

6. The system of claim 1, wherein the processor is further operable to:
   communicate a notification to the first applet including information indicating that the second applet data is incomplete;
   determine incomplete data of the second applet data;
   communicate, from the first applet to the second applet, third applet data corresponding to the incomplete data of the second applet data; and
   replace values of the second applet data with values of the third applet data.

7. The system of claim 1, wherein the first applet data and the second applet data are exclusively stored and managed by the first applet and the second applet, respectively.

8. A computer-implemented method for managing applets of mobile wallet applications, the method comprising steps of:
   receiving, over a communications network, a first request to personalize a first applet, wherein the first applet including first applet data;
   communicating, in response to receiving the request to personalize the first applet, a second request to a second applet, the second request including a command requesting at least a portion of second applet data previously stored for use by the second applet;

communicating at least the portion of the second applet data to the first applet upon the second applet being authenticated to the first applet; and replacing one or more values of the first applet data of the first applet with one or more values of at least the portion of the second applet data of the second applet.

9. The method of claim 8, wherein the first applet data and the second applet data each comprise cryptographic parameters including at least one of: (1) a passcode, and (2) a mobile wallet client unique code.

10. The method of claim 9, wherein the first applet is a set of instructions stored on the at least one memory, which when executed by a processor, cause the processor to manage the first applet data.

11. The method of claim 9, wherein the second applet is a set of instructions stored on the at least one memory, which when executed by a processor, cause the processor to manage the second applet data.

12. The method of claim 8, wherein the first applet and the second applet are stored in a secure element associated with a mobile device.

13. The method of claim 8, further comprising steps of:
communicating a notification to the first applet including information indicating that the second applet data is incomplete;
determining incomplete data of the second applet data;
communicating, from the first applet to the second applet, third applet data corresponding to the incomplete data of the second applet data; and
replacing values of the second applet data with values of the third applet data.

14. The method of claim 8, wherein the first applet data and the second applet data are exclusively stored and managed by the first applet and the second applet, respectively.

15. A non-transitory computer-readable medium having stored thereon sequences of instructions for managing applets of mobile wallet applications that, when executed by a computer hardware processor, cause the processor to:
receive, over a communications network, a first request to personalize a first applet, wherein the first applet including first applet data;
communicate, in response to receiving the request to personalize the first applet, a second request to a second applet, the second request including a command requesting at least a portion of second applet data previously stored for use by the second applet;
communicate at least the portion of the second applet data to the first applet upon the second applet being authenticated to the first applet; and
replace one or more values of the first applet data of the first applet with one or more values of the at least a portion of the second applet data of the second applet.

16. The non-transitory computer-readable medium of claim 15, wherein the first applet data and the second applet data each comprise cryptographic parameters including at least one of: (1) a passcode, and (2) a mobile wallet client unique code.

17. The non-transitory computer-readable medium of claim 16, wherein the first applet is a set of instructions stored on a memory, which when executed by the computer processor, cause the computer processor to manage the first applet data.

18. The non-transitory computer-readable medium of claim 16, wherein the second applet is a set of instructions stored on a memory, which when executed by the computer processor, cause the computer processor to manage the second applet data.

19. The non-transitory computer-readable medium of claim 15, wherein the first applet and the second applet are included in a secure element associated with a mobile device.

20. The non-transitory computer-readable medium of claim 15, wherein the sequences of instructions, when executed by the computer processor, further cause the processor to:
communicate a notification to the first applet including information indicating that the second applet data is incomplete;
determine incomplete data of the second applet data;
communicate, from the first applet to the second applet, third applet data corresponding to the incomplete data of the second applet data; and
replace values of the second applet data with values of the third applet data.

21. The non-transitory computer-readable medium of claim 15, wherein the first applet data and the second applet data are exclusively stored and managed by the first applet and the second applet, respectively.

* * * * *